(12) United States Patent
Marum et al.

(10) Patent No.: US 8,391,469 B2
(45) Date of Patent: Mar. 5, 2013

(54) METHODS AND APPARATUS TO DECODE DUAL-TONE SIGNALS

(75) Inventors: Steven Edward Marum, Sherman, TX (US); Kenneth L. Williams, Sherman, TX (US)

(73) Assignee: Texas Instruments Incorporated, Dallas, TX (US)

(*) Notice: Subject to any disclaimer, the term of this patent is extended or adjusted under 35 U.S.C. 154(b) by 1271 days.

(21) Appl. No.: 12/171,832

(22) Filed: Jul. 11, 2008

(65) Prior Publication Data

US 2010/0008493 A1 Jan. 14, 2010

(51) Int. Cl.
 *H04M 1/00* (2006.01)
 *H04M 3/00* (2006.01)
 *G06F 17/10* (2006.01)

(52) U.S. Cl. ........................ 379/386; 708/312

(58) Field of Classification Search ................ 379/386, 379/351, 372; 340/6.1–8.1; 375/316, 340–342
See application file for complete search history.

(56) References Cited

U.S. PATENT DOCUMENTS

| 6,370,555 | B1* | 4/2002 | Bartkowiak | 708/311 |
| 2002/0031086 | A1* | 3/2002 | Welin | 370/229 |
| 2003/0123643 | A1* | 7/2003 | Burgess | 379/352 |
| 2006/0250152 | A1* | 11/2006 | Rius Vazquez et al. | 324/765 |

FOREIGN PATENT DOCUMENTS

JP 08163608 A * 6/1996

OTHER PUBLICATIONS

"Clock System Design" by Kenneth Wagner, IEEE Oct. 1988, p. 9-27.*

* cited by examiner

*Primary Examiner* — Fan Tsang
*Assistant Examiner* — Jeffrey Lytle
(74) *Attorney, Agent, or Firm* — Alan A. R. Cooper; Wade J. Brady, III; Frederick J. Telecky, Jr.

(57) ABSTRACT

Methods and apparatus to decode dual-tone signals are disclosed. An example receiver to decode a dual-tone signal includes a tone detector to detect a start of a first tone, a first counter to count first cycles of the first tone, a second counter to count second cycles of a system clock while the first counter is counting and the first count is less than a first threshold, state control logic to start the second counter counting third cycles of the clock when a time period elapses, the third count being substantially equal to the second count, the first counter to count fourth cycles of a second tone while the third cycles are counted, and a decoder to compare the fourth count to a second threshold to identify an event represented by the signal.

19 Claims, 9 Drawing Sheets

| 110 | 305 | 310 | 315 | 320 |
|---|---|---|---|---|
| TRIGGER EVENT | NOMINAL FREQUENCY (KHz) | FREQUENCY RATIO | COUNT$_2$ | COMPARATOR RANGE |
| REFERENCE | 250 | N/A | N/A | N/A |
| S4 | 218 | 0.87 | 55+/-2 (53-57) | 52-59 |
| S3 | 186 | 0.74 | 47+/-2 (45-49) | 44-51 |
| S2 | 154 | 0.62 | 39+/-2 (37-41) | 36-43 |
| S1 | 122 | 0.49 | 31+/-2 (29-33) | 28-35 |
| S0 | 90 | 0.36 | 23+/-2 (21-25) | 20-27 |

METHODS AND APPARATUS TO DECODE DUAL-TONE SIGNALS

FIELD OF THE DISCLOSURE

This disclosure relates generally to dual-tone signals, and, more particularly, to methods and apparatus to decode dual-tone signals.

BACKGROUND

Information can be sent over a communication medium such as a wire using tones of different amplitude, phase and/or frequency. For example, information can be transmitted using a dual-tone signal comprising a first tone having a first frequency and a second tone having a second frequency. To accommodate transmitters and receivers that use asynchronous clocks, data is encoded in a dual-tone signal based on the ratio of the two frequencies rather than based on the actual first and second frequencies. To receive data encoded or represented by a dual-tone signal, a receiver may estimate the first and second frequencies, compute a ratio of the estimated frequencies, and decode the ratio to determine the transmitted data.

SUMMARY

Example methods and apparatus to decode dual-tone signals are disclosed. The examples described herein realize a number of advantages. For example, a dual-tone signal can be decoded using an asynchronous clock having a large tolerance (e.g., 20%), and without the need to perform a division of two values representative of the frequencies of the two tones of the dual-tone signal. Performing division is generally a computation complex operation, especially for devices that do not include a processor.

A disclosed example receiver apparatus to decode a dual-tone signal includes a tone detector to detect a start of a first tone of the dual-tone signal, a first counter to count first cycles of the first tone when the first tone is detected, a second counter to count second cycles of a system clock while the first counter is counting the first cycles of the first tone and the first count of cycles is less than a first threshold, state control logic to start the second counter counting third cycles of the system clock when a time period elapses, the third count of cycles of the system clock being substantially equal to the second count of cycles, the first counter to count fourth cycles of a second tone of the dual-tone signal while the second counter is counting the third cycles of the system clock, and a decoder to compare the fourth count of cycles to a second threshold to identify an event represented by the dual-tone signal.

A disclosed example method includes determining a first length of a first time interval during which a first number of cycles of a first tone of a dual-tone signal occur, counting a second number of cycles of a second tone of the dual-tone signal occurring during a second time interval having a second length substantially equal to the first length, and comparing the second number of cycles to a first threshold to identify an event represented by the dual-tone signal.

DETAILED DESCRIPTION

Figures 1, 3:
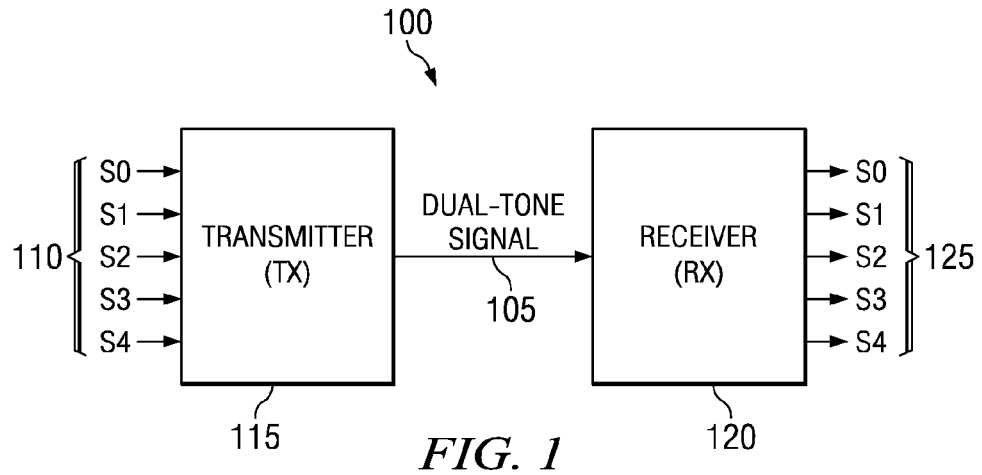
FIG. 1 is a schematic diagram of an example communication system that uses a dual-tone signal to convey data or an event.
FIG. 3 is a table showing example dual-tone signal parameters for the example communication system of FIG. 1.

FIG. 1 is a schematic illustration of an example communication system 100 that uses a dual-tone signal 105 to convey one of a plurality of events 110 between a transmitter 115 and a receiver 120. Using any number and/or type(s) of algorithm (s), logic, method(s), circuit(s), device(s) and/or component (s), the example transmitter 115 detects when one of the example events 110 has occurred, forms a dual-tone signal 105 that represents the detected event 110, and sends the generated dual-tone signal 105 to the receiver 120. An example manner of implementing the example transmitter 115 of FIG. 1 is described below in connection with FIG. 4.

In general, the example receiver 120 of FIG. 1 detects and decodes the dual-tone signal 105, and outputs an event 125 represented by the dual-tone signal 105. In the absence of errors or noise, a sequence of events 125 output by the receiver 120 is identical to a sequence of events 110 detected at the transmitter 115. However, the dual-tone signal 105 received by the example receiver 120 of FIG. 1 will typically be different from the dual-tone signal 105 transmitted by the transmitter 115 due to, for example, distortion (e.g., amplitude or phase) or noise introduced by the communication medium used to transport or store the dual-tone signal 105, and/or noise or distortion introduced by the transmitter 115 and/or the receiver 120. An example manner of implementing the example receiver 120 of FIG. 1 is described below in connection with FIGS. 5 and 6.

Because dual-tone signals contain sufficient information to permit detection and decoding, the dual-tone signal 105 only needs to be transmitted when an event 110 is detected at the transmitter 115. In some examples, the dual-tone signal 105 is transmitted in conjunction with or on top of other signals present on a communication medium. For example, a wire may be used to provide an analog bias signal with the dual-tone signal 105 (when it is present) superimposed on top of the analog bias signal. In such examples, the dual-tone signal 105 may be transmitted with sufficiently low amplitude to avoid interference or degradation of the underlying signal (e.g., the analog bias signal). While dual-tone signals 105 may be superimposed or combined with other signals, for ease of discussion and illustration, such underlying signals will not be discussed further herein.

Figure 2:
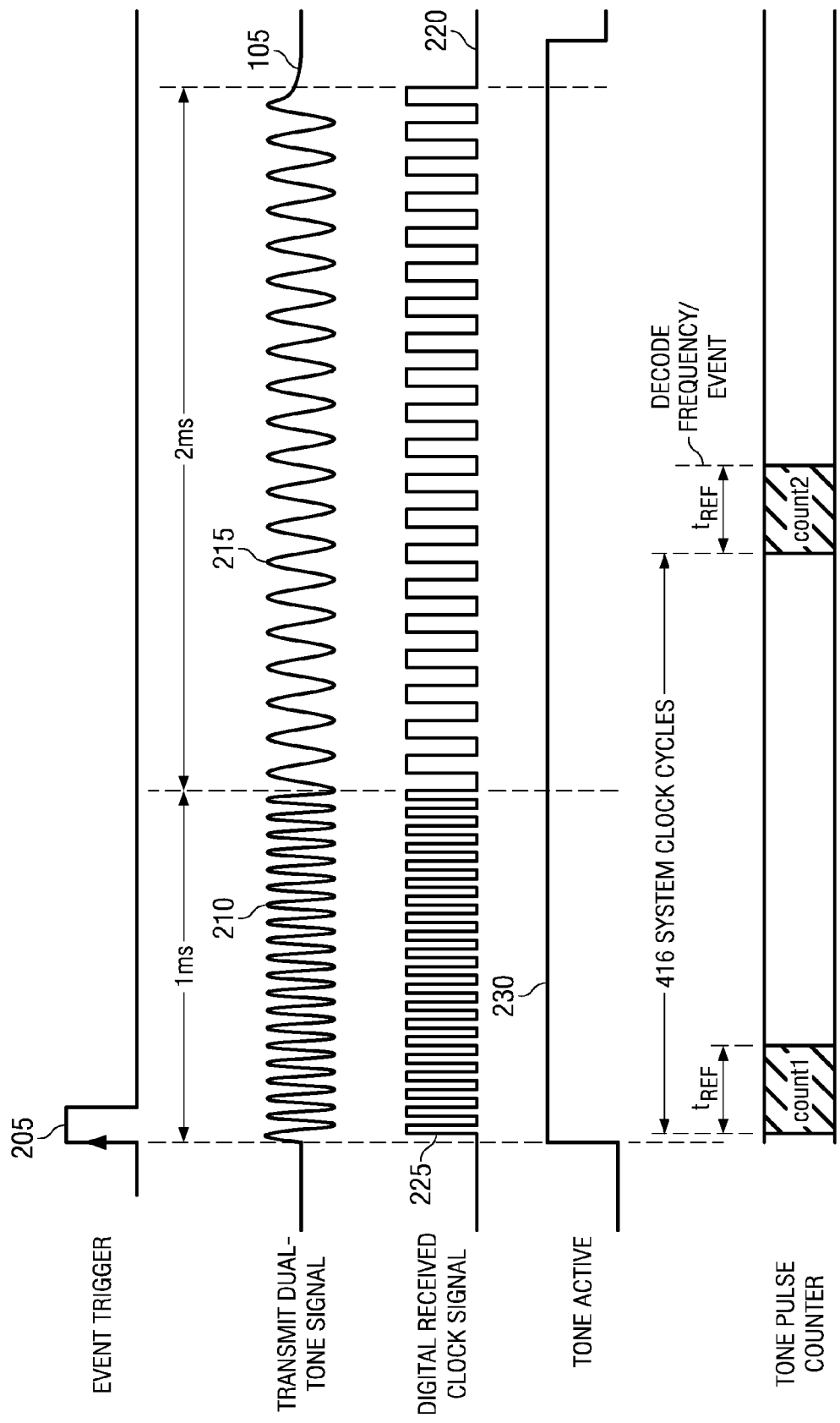
FIG. 2 is a timing diagram illustrating an example operation of the example communication system of FIG. 1.

As shown in FIG. 2, when the example transmitter 115 of FIG. 1 detects that one of the events 110 has occurred 205, the transmitter 115 transmits a first tone 210 (i.e., a reference tone) for 1 millisecond (ms). The example first tone 210 of FIG. 1 has a frequency that is the operating (i.e., system clock) frequency of the example transmitter 115, which is nominally 250 thousand cycles per second (kHz). Following the first tone 210, the example transmitter 115 transmits a second tone 215 for 2 ms. The frequency of the example second tone 215 of FIG. 2 is selected by the transmitter 115 based on the particular event 110 that was detected. The table of FIG. 3 lists example nominal frequencies 305 of the second tone 215 for each of the example events 110. For example, if the event S2 was detected at the transmitter 115, the second tone 215 has a nominal frequency of 154 kHz, assuming that the transmitter's system clock is operating at the nominal frequency of 250 kHz. If the system clock of the transmitter 115 is not operating at 250 kHz, then the frequency of the second tone 215 will be correspondingly different, being based on a ratio to the frequency of the transmitter's system clock. For example, the actual frequency of the second tone 215 will be the actual frequency of the system clock (i.e., the frequency of the first tone 210) multiplied by a ratio 310 corresponding to the detected event 110. For example, if the event S2 was detected and the system clock of the transmitter 115 is operating at 200 kHz, then the frequency of the second tone 215 is 124 kHz, which is 0.62*200 kHz. A number of different ratios 310 are shown in FIG. 3.

Returning to FIG. 2, the example receiver 120 of FIG. 1 converts the received example dual-tone signal 105 of FIG. 2 into a digital received clock signal 220 having high frequency and low frequency portions corresponding to the first tone 210 and the second tone 215. The example digital received clock signal 220 of FIG. 2 may be formed, for example, by comparing the dual-tone signal 105 to a zero voltage level using a comparator, or by detecting zero-crossings of the received dual-tone signal 105 and using the zero crossings to create rising and falling edges of the digital received clock signal 220. However, any number and/or type(s) of algorithm(s), logic, method(s), circuit(s), device(s) and/or component(s) may be used to convert the received dual-tone signal 105 into the digital received clock signal 220. In the illustrated examples of FIGS. 1 and 2, the digital received clock signal 220 only toggles when a dual-tone signal 105 is present at the input of the example receiver 120.

The example receiver 120 of FIG. 1 detects the first tone 210 by detecting an initial rising edge 225 of the digital received clock signal 220. In some examples, the receiver 120 may wait for more than one rising edge 225 before determining that a dual-tone signal 105 has started. When the tone 210 is detected, a tone active signal 230 goes to an active state (e.g., a logical value of '1') causing the example receiver 120 to measure the time $t_{REF}$ required to count a fixed or preset number of cycles (e.g., 63) of the digital received signal corresponding to the first tone 210. The receiver 120 then waits for a fixed or preset length of time, and then counts the number of cycles of the digital received clock signal 220 corresponding to the second tone 215 that occur in the same length of time $t_{REF}$. In the illustrated example of FIG. 2, the receiver 120 waits for 416 cycles of its system clock, which corresponds to approximately 1.67 ms at the nominal frequency of 250 kHz, before counting cycles of the digital received clock signal 220 corresponding to the second tone 215. As described below in connection with FIGS. 8A-C, waiting for 416 clock cycles of the receiver's system clock before counting cycles of the second tone 215 ensures that across the combinations of system clock tolerances of the transmitter 115 and the receiver 120 that the second count corresponds to cycles of the second tone 215. Additionally or alternatively, the receiver 120 could detect a frequency change in the digital received clock signal 220 to determine when to count the cycles of the second tone 215.

Traditionally, the data represented by the example received digital clock signal 220 is determined by computing the ratio of the frequency of the second tone 215 and the first tone 210, which can be expressed as $freq_2/freq_1$, where $freq_1$ is the detected frequency of the first tone 210 and $freq_2$ is the detected frequency of the second tone 215. The ratio is then used to identify which event 110 was represented by the dual-tone signal 110. The frequencies of the first and second tones 210 and 215, $freq_1$ and $freq_2$, are proportional to the tone cycle counts computed by the receiver 120. Thus, the frequency ratio can be expressed as $count_2/count_1$, where $count_1$ is the number of cycles of the digital received clock signal 220 corresponding to the first tone 210 that occurred during the length of time $t_{REF}$ and $count_2$ is the number of cycles of the digital received signal corresponding to the second tone 215 that occurred during the same length of time $t_{REF}$. Because in the examples described herein, $count_1$ is a constant (e.g., 63), the length of time $t_{REF}$ is measured such that $count_1$ has the desired value, and $count_2$ is measured over the same length of time $t_{REF}$, the frequency ratio is directly proportional to $count_2$. For example, for a count of 63 cycles of a frequency of 250 kHz, 252 microseconds (μs) must transpire. At a frequency of, for example, 218 kHz roughly 55 cycles will transpire in 252 μs. In particular, the event 110 represented by the received digital clock signal 220 corresponding to the dual-tone signal 105 can be determined and/or identified by comparing $count_2$ to a plurality of thresholds.

FIG. 3 shows expected or nominal $count_2$ values 315 for each of the example events 110 of FIG. 1. The nominal $count_2$ value 315 for a particular event 110 is computed by multiplying its corresponding frequency ratio 310 and the constant $count_1$. The example $count_2$ values 315 of FIG. 3 are computed using a $count_1$ value of 63. For example, the nominal $count_2$ value 315 for the event S4 is 55, which is approximately 63*0.87. Due to quantization effects and/or the use of asynchronous clocks, actual $count_2$ values can vary as much as +/−2 from the nominal values. Accordingly, to identify an event 110, the actual $count_2$ value is compared to a range of values 320 corresponding to each of the events 110. For example, if the actual value of $count_2$ is 30, which falls in the range 320 defined by 28 and 35, the example receiver 120 of FIG. 2 identifies that the example event S1 occurred at the transmitter 115. If the actual value of $count_2$ falls below the range 320 for the event S0 or above the range 320 for event S4, the example receiver 120 does not identify or output an event 125.

Figure 4:
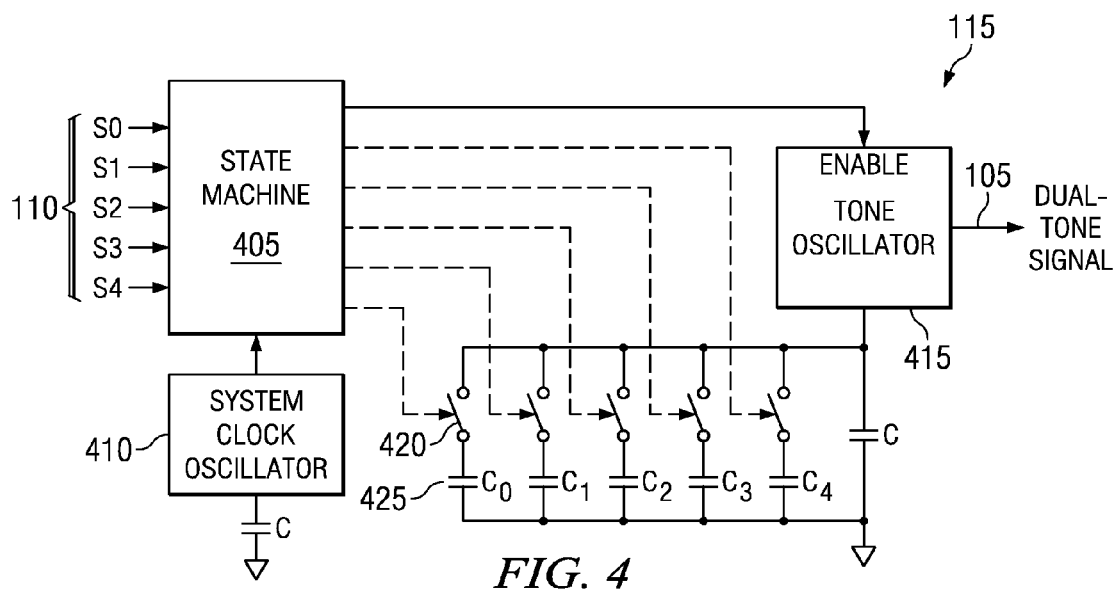
FIG. 4 illustrates an example manner of implementing the example transmitter of FIG. 1.

FIG. 4 illustrates an example manner of implementing the example transmitter 115 of FIG. 1. To detect events 110 and control dual-tone signal generation, the example transmitter 115 of FIG. 4 includes a state machine 405 and a system clock oscillator 410 that drives the example state machine 405.

To generate the dual-tone signal 105, the example transmitter 115 includes a tone oscillator 415. The example system clock oscillator 410 and the example tone oscillator 415 of FIG. 4 are nominally identical. The frequencies of the oscillators 410 and 415 are determined by capacitances that are electrically coupled to the oscillators 410 and 415. Each of the oscillators 410 and 415 have a fixed capacitor C such that the oscillators 410 and 415 can be configured to operate at nominally the same frequency (e.g., 250 kHz). The frequency of the example tone oscillator 415 can be adjusted using metal-oxide-semiconductor field-effect transistor (MOSFET) switches (one of which is designated at reference numeral 420) to connect different capacitances (one of which is designated at reference numeral 425) to the tone oscillator 415 to increase the oscillation period of the tone oscillator 415. Because the period of the tone oscillator 415 is proportional to the capacitance ratio (i.e., the ratio of C to C+$C_0$), the ratio of the frequencies of the first tone 210 and the second tone 215 of FIG. 2 can be controlled by adjusting this capacitance ratio, which is determined by simple geometry. Although, the absolute frequency of the tone oscillator 415 can vary over process parameters, supply voltages and temperature, the ratio of the frequencies of the first and second tones 210 and 215 remains substantially fixed.

When an event 110 is detected (e.g., by detecting a button or key press), the example state machine 405 of FIG. 4 enables the example tone oscillator 415 to generate the example dual-tone signal 105. It first enables the tone oscillator 415 with only the fixed capacitor C connected to the tone oscillator 415 to generate the first tone 210. The example state machine 405 waits 1 ms (as measured using the system clock oscillator 410) and then controls one or more of the switches 420 to connect additional capacitance to the tone oscillator 415 to generate the second tone 215. The additional capacitance that is added depends on the particular event 110 that was detected. The state machine 405 waits 2 ms, disables the tone oscillator 415, and then waits for another event 110.

While an example manner of implementing the example transmitter 115 of FIG. 1 is illustrated in FIG. 4, a transmitter may be implemented using any number and/or type(s) of alternative and/or additional logic, devices, components, circuits, modules, interfaces, etc. Further, the logic, devices, components, circuits, modules, elements, interfaces, etc. illustrated in FIG. 4 may be combined, divided, re-arranged, omitted, eliminated and/or implemented in any other way. Moreover, transmitter may include additional logic, devices, components, circuits, interfaces and/or modules instead of, or in addition to those illustrated in FIG. 4.

Figure 5:
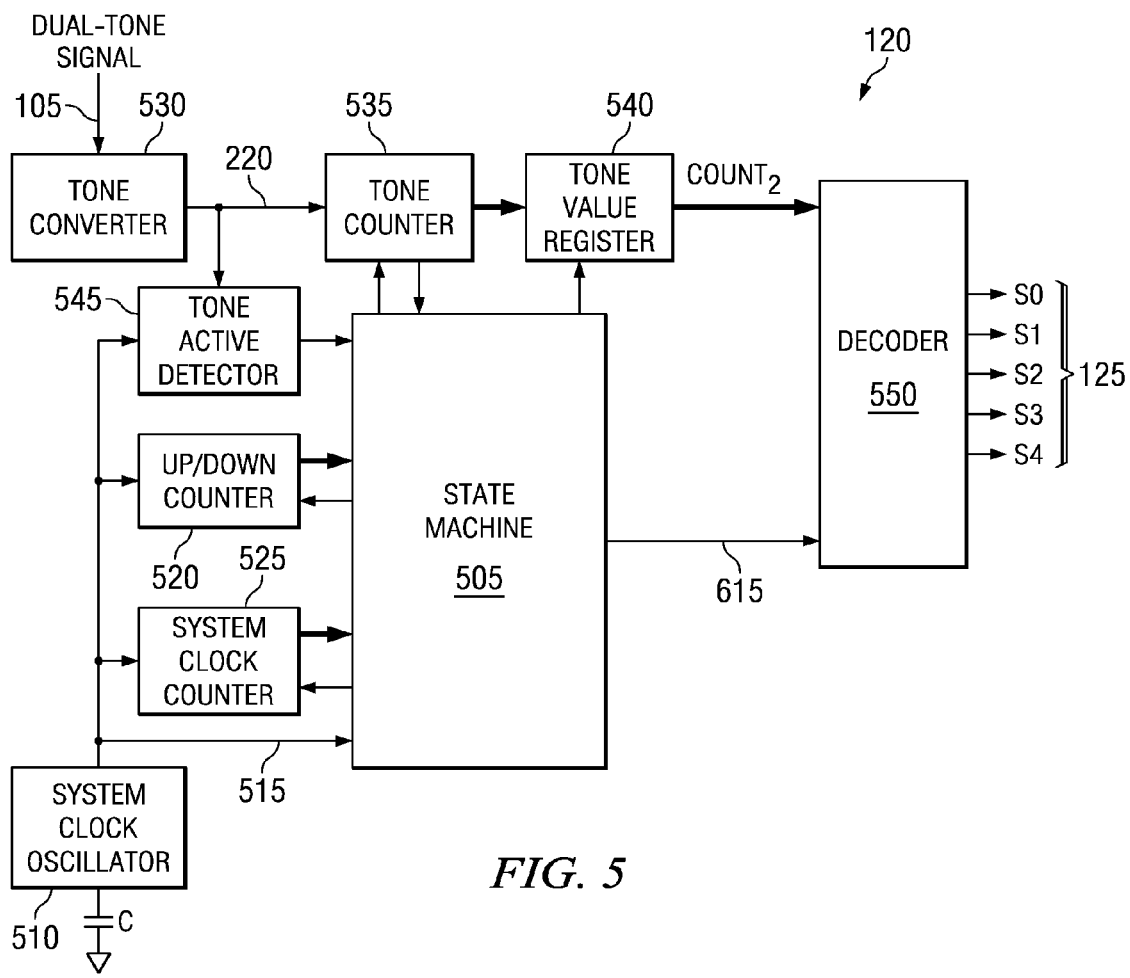
FIG. 5 illustrates an example manner of implementing the example receiver of FIG. 1.

FIG. 5 illustrates an example manner of implementing the example receiver 120 of FIG. 1. To control the example receiver 120 of FIG. 5, the receiver 120 includes a state machine or state control logic and a system clock oscillator 510 that drives the state machine 505. The example system clock oscillator 510 of FIG. 5 is nominally identical to the example system clock oscillator 410 of FIG. 4 and generates a system clock 515 operating at nominally the same frequency (e.g., 250 kHz) as the system clock of the transmitter 115. An example operation of the example state machine or state control logic 505 and/or, more generally, the example receiver 120 of FIG. 5 is described below in connections with FIGS. 7A and 7B.

To measure the length of the example time period $t_{REF}$ of FIG. 2, the example receiver 120 of FIG. 5 includes an up/down counter 520. When enabled by the example state machine 505, the example up/down counter 515 counts cycles of the system clock 515. The example up/down counter 515 can be controlled by the state machine 505 to: (a) count upwards from zero, (b) hold the current count, and (c) count downwards from a current count to zero.

To count the period of time to wait until cycles of the second tone 215 are counted, the example receiver 120 of FIG. 5 includes a system clock counter 525. When enabled by the example state machine 505, the example system clock counter 525 counts cycles of the system clock 515.

To count cycles of a tone of the dual-tone signal 105, the example receiver 120 of FIG. 5 includes a tone converter 530 and a tone counter 535. Using any number and/or type(s) of algorithm(s), logic, method(s), circuit(s), device(s) and/or component(s), the example tone converter 530 of FIG. 5 converts the analog dual-tone signal 105 into the example digital received clock signal 220. For example, the tone converter 530 detects zero-crossings of the received dual-tone signal 105 and uses the zero crossings to create rising and falling edges of the received digital clock signal 220. In the illustrated example of FIG. 5, the digital received clock signal 220 only toggles when a dual-tone signal 105 is present at the input of the example receiver 120.

When enabled by the example state machine 505, the example tone counter 535 of FIG. 5 counts cycles (e.g., rising edges) of the digital received clock signal 220. To store a tone cycle count generated by the example tone counter 535, the example receiver 120 of FIG. 5 includes a tone value register 540.

To simplify synchronization between elements of the example receiver 120 of FIG. 5 that operate using different clock sources (i.e., the system clock 515 and the digital received clock signal 220), the example counters 520, 525 and 535 of FIG. 5 encode, store and/or represent counts using gray-code values such that only one bit is different between any two consecutive values. Thus, if a value generated using one clock source (e.g., the digital received clock signal 220) is captured by a circuit using another clock (e.g., the system clock 515), the captured value is always within one count of the desired value. In this way, the chance of a race condition between bits causing erroneous results is eliminated or substantially reduced. While gray-coded values are used herein, other methods to synchronize events resulting from different clocks may, additionally or alternatively, be used.

To detect the start of the first tone 210 of a dual-tone signal 105, the example receiver 120 of FIG. 5 includes a tone active detector 545. The example tone active detector 545 of FIG. 5 detects the first tone 210 by detecting one or more initial rising edges of the digital received clock signal 220.

To identify the event 125 represented by the dual-tone signal 105, the example receiver 120 of FIG. 5 includes a decoder 550. The example decoder 550 compares the number of cycles of the digital received clock signal 220 corresponding to the second tone 215, $count_2$, to one or more ranges to identify the event 125. The example decoder 550 outputs the identified event 125 for use by a device, circuit, component and/or processor communicatively coupled to the receiver 120 (not shown). An example manner of implementing the example decoder 550 of FIG. 5 is described below in connection with FIG. 6.

Figure 6:
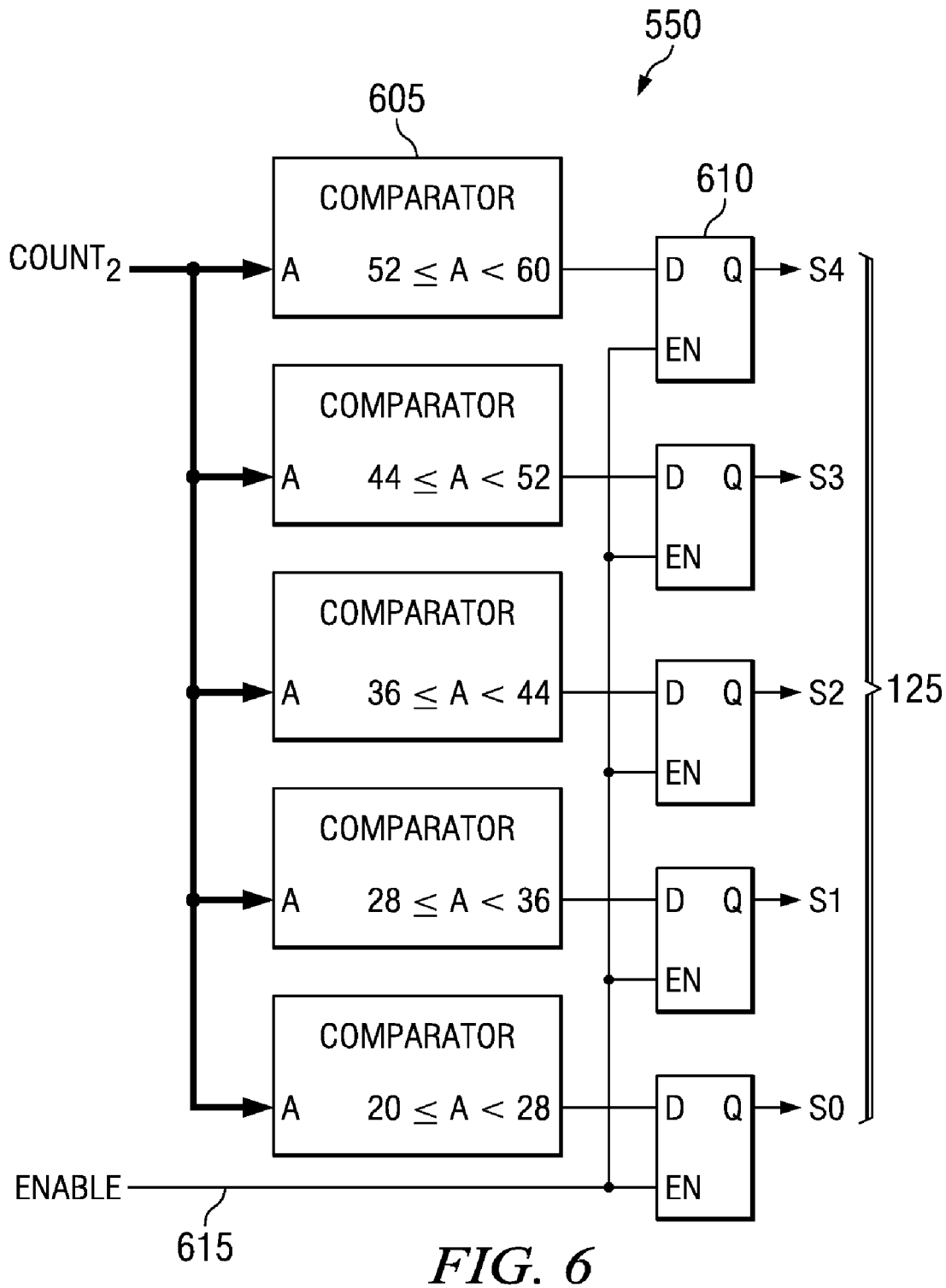
FIG. 6 illustrates an example manner of implementing the example decoder of FIG. 5.

FIG. 6 illustrates an example manner of implementing the example decoder 550 of FIG. 5. To identify the event 125 corresponding to the value $count_2$, the number of cycles of the digital received clock signal 220 corresponding to the second tone 215 that occurred in a period of time of length $t_{REF}$, the example decoder 550 of FIG. 6 includes comparators (one of which is designated at reference numeral 605) for corresponding ones of the events 125 that can be identified by the decoder 550. The example comparator 605 of FIG. 6 has a logical output of "1" when the value of $count_2$ is less than or equal to 60 and greater than or equal to 52. If the value of $count_2$ is not in this range, the logical output of the comparator 605 is "0."

To capture and output the identified event 125, the example decoder 550 of FIG. 6 includes latches (one of which is designated at reference numeral 610) for corresponding ones of the comparators 605. When enabled 615 by the example state machine 505 of FIG. 5, each of example the latches 610 of FIG. 6 latch and output a respective output of the comparators 605. Accordingly, an identified event 125 will have a logical value of "1" when it is represented by the dual-tone signal 105 and the other outputs 125 will have a logical value of "0."

While an example manner of implementing the example receiver 120 of FIG. 1 has been illustrated in FIGS. 5 and 6, one or more of the logic, devices, components, circuits, modules, and/or interfaces illustrated in FIGS. 5 and/or 6 may be combined, divided, re-arranged, omitted, eliminated, and/or implemented in any other way. For example, the system clock counter 525 could be implemented or replaced by an analog RC delay. Further, the example state machine 510, the example oscillator 510, the example counters 520, 525 and 535, the example converter 530, the example detector 545, the example register 540, the example decoder 550, the example comparators 605, the example flip-flops 610 and/or, more generally, the example receiver 120 of FIGS. 5 and 6 may be implemented by hardware, software, firmware and/or any combination of hardware, software and/or firmware. Thus, for example, any or all of the example state machine 510, the example oscillator 510, the example counters 520, 525 and 535, the example converter 530, the example detector 545, the example register 540, the example decoder 550, the example comparators 605, the example flip-flops 610 and/or, more generally, the example receiver 120 may be implemented by one or more circuit(s), programmable processor(s), application specific integrated circuit(s) (ASIC(s)), programmable logic device(s) (PLD(s)) and/or field programmable logic device(s) (FPLD(s)), etc. Further still, a receiver may include logic, devices, components, circuits, modules, and/or interfaces instead of, or in addition to, those illustrated in FIGS. 5 and 6 and/or may include more than one of any or all of the illustrated logic, devices, components, circuits, modules, and/or interfaces.

Figure 7A:
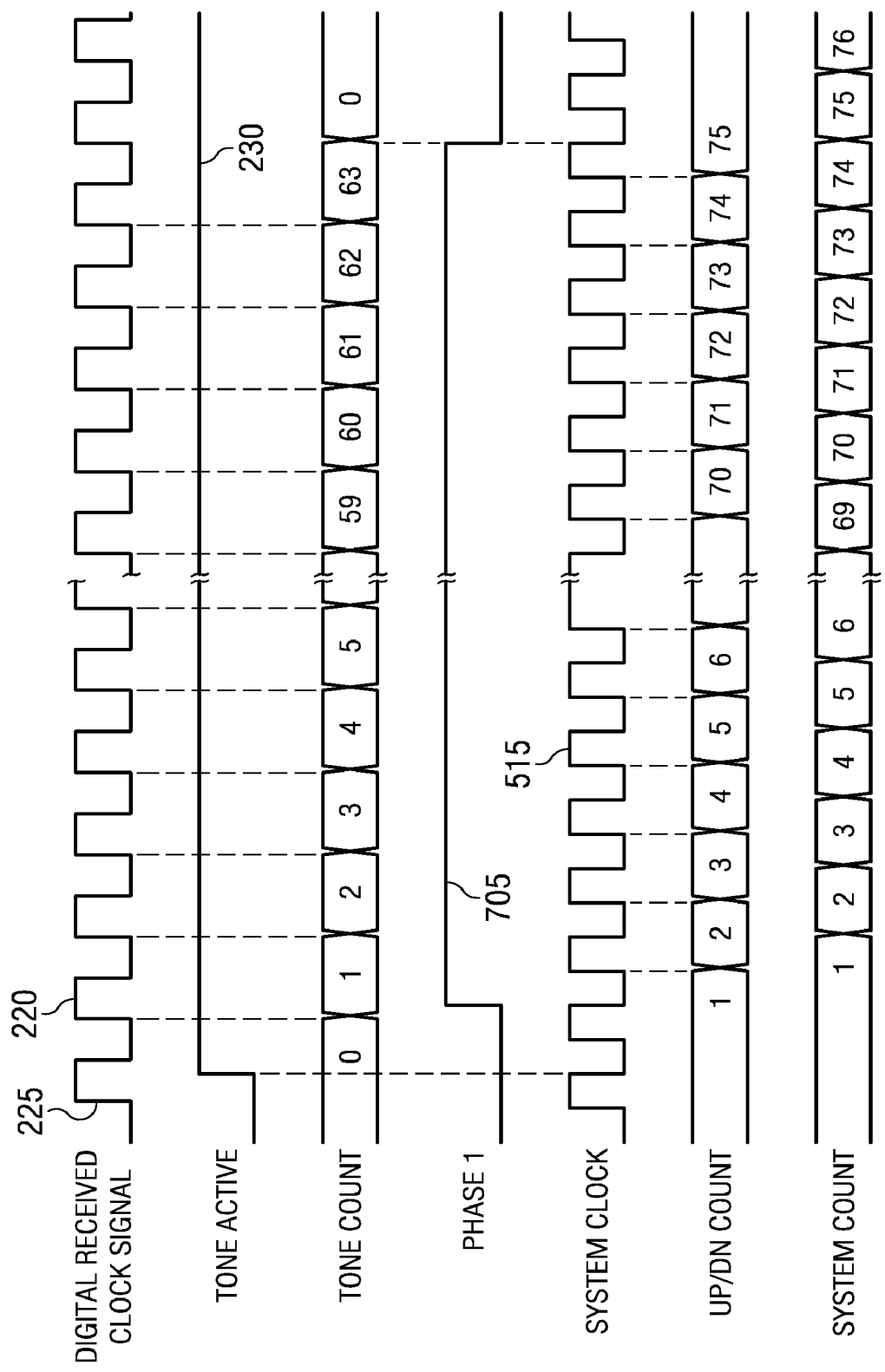
FIGS. 7A and 7B are a timing diagram illustrating an example operation of the example receiver of FIG. 5.
Figure 7B:
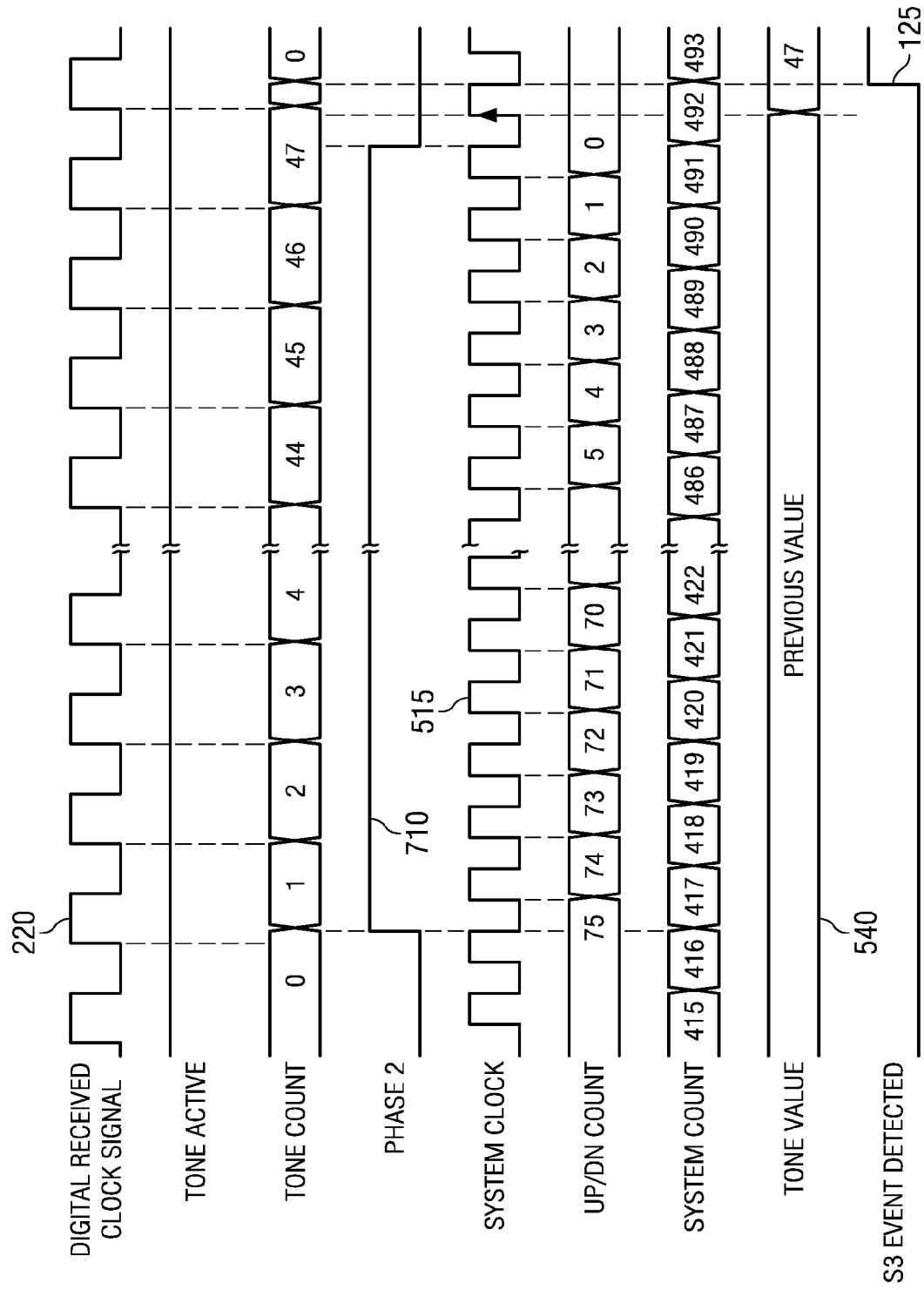

FIGS. 7A and 7B are collectively a timing diagram illustrating an example operation of the example receiver 120 of FIG. 5. The example timing diagram of FIG. 7A begins when the example received digital clock signal 220 starts changing state in response to a received dual-tone signal 105 (not shown). The example tone active detector 545 detects the start of the digital received clock signal 220 by, for example, detecting an initial rising edge 225 of the digital clock signal 220, and asserts the tone active signal 230. When the tone active signal 230 transitions to a logical value of "1," the example state machine or state control logic 505 asserts a phase 1 control signal 705 that (a) enables the example tone counter 535 to start counting rising edges of the received clock signal 225 corresponding to the first tone 210, (b) enables the example up/down counter 520 to start counting rising edges of the system clock 515, and (c) enables the system clock counter 525 to also start counting rising edges of the systems clock 515.

The counters 535, 520 and 525 continue counting until the value of the tone counter 535 reaches a fixed or preset value. When the tone counter 535 reaches the preset value (e.g., 63), the state machine 505 de-asserts the phase 1 control signal 705 (i.e., transitions it to a logical value of "0"), that (a) resets the tone counter 535 and (b) stops, but does not reset, the up/down counter 520. The value stored in the up/down counter 520, which is 75 in the illustrated example) represents the time duration $t_{REF}$ measured in rising edges of the system clock 515.

The example timing diagram of FIG. 7A is continued in FIG. 7B. When the value of the example system clock counter 525 reaches a fixed or preset value (e.g., 416), the state machine or state control logic 505 asserts a phase 2 control signal 710 that (a) enables the example up/down counter 520 to count down from its current value (i.e., $t_{REF}$=75) to zero and (b) enables the tone counter 535 to count cycles of the digital received clock signal 220 corresponding to the second tone 215 of the received clock signal 225. When the up/down counter 520 reaches zero, the state machine 505 de-asserts the phase 2 control signal 710. When the phase 2 control signal 710 goes to a logical "0," (a) the value $count_2$ of the tone counter 535 (which is 47 in the illustrated example) is stored in the tone value register 540, and (b) the example decoder 550 compares the value of $count_2$ with the example ranges 320 of FIG. 3 to identify and output an event 125. In the illustrated example of FIG. 7B, example decoder 550 determines that the identified event is the example event S3 because 47 is less than 51 and greater than 44.

Figure 8A:
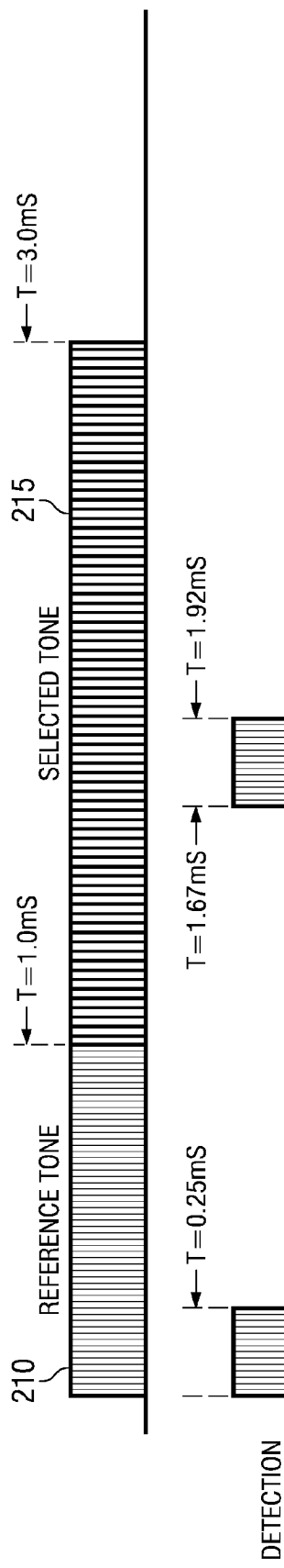
FIGS. 8A-8C illustrate example timing diagrams for the example communication system of FIG. 1.
Figure 8B:
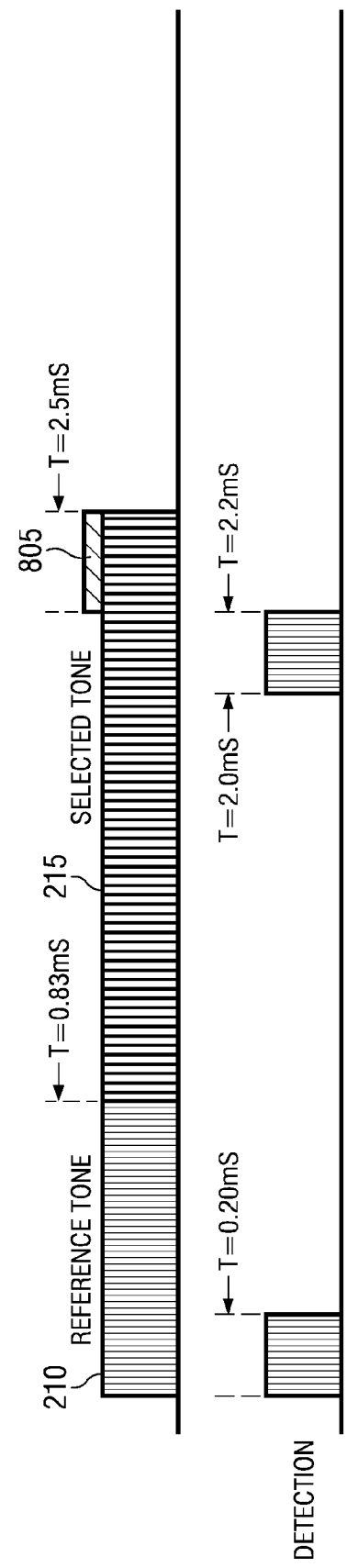
Figure 8C:
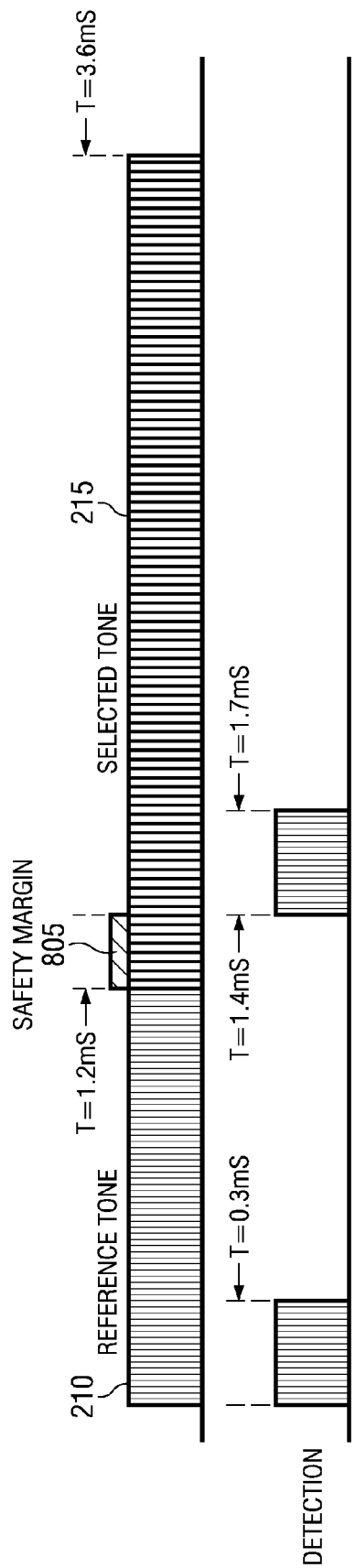

FIGS. 8A, 8B and 8C illustrate example clock frequency variation scenarios for the example communication system 100 of FIG. 1. In the illustrated example of FIG. 8A, the transmitter 115 and the receiver 120 have system clocks 410 and 510, respectively, that are operating at their nominal frequency of 250 kHz. As shown in FIG. 8A, by waiting 416 cycles of the system clock 510, the receiver 120 measures the cycles of the second tone 215 during approximately the middle of the second tone 215.

In the illustrated example of FIG. 8B, the system clock 410 of the transmitter 115 is operating 20% faster than the nominal frequency (i.e., 300 kHz) and the system clock 510 of the receiver 120 is operating 20% slower than the nominal frequency (i.e., 208 kHz, which is approximately 250 kHz/1.2). Because the transmitter 115 is operating 20% faster, the length of the first or reference tone 210 is 0.83 ms rather than the nominal 1 ms, and the length of the second tone 215 is shorter (i.e., 1.67 ms rather than 2 ms). Because the receiver 120 is operating 20% slower, the counting of the cycles of the second tone 215 starts at 2.0 ms rather than 1.67 ms. However, as shown in FIG. 8B, the receiver 120 still has a safety margin 805 of approximately 0.3 ms when counting the cycles of the second tone 215.

In the illustrated example of FIG. 8C, the system clock 410 of the transmitter 115 is operating 20% slower than the nominal frequency (i.e., 208 kHz, which is approximately 250 kHz/1.2) and the system clock 510 of the receiver 120 is operating 20% faster than the nominal frequency (i.e., 300 kHz). Because the transmitter 115 is operating 20% slower, the length of the first or reference tone 210 is 1.2 ms rather than the nominal 1 ms. Because the receiver 120 is operating 20% faster, the counting of the cycles of the second tone 215 starts at 1.4 ms rather than 1.67 ms. However, as shown in FIG. 8C, the receiver 120 still has a safety margin 810 of approximately 0.2 ms when counting the cycles of the second tone 215.

Figure 9:
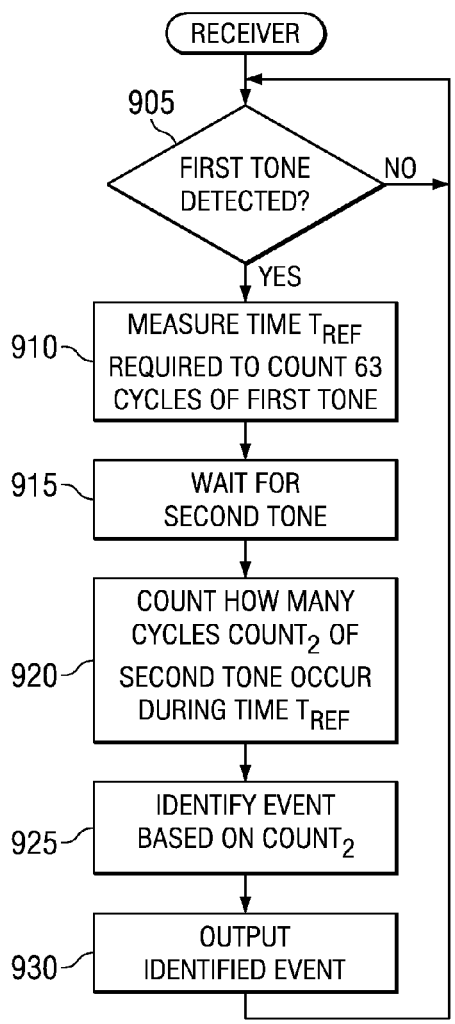
FIG. 9 is a flowchart of an example process that may be carried out to implement the example receiver of FIG. 1.

FIG. 9 is a flowchart representative of example process that may be carried out to decode the example dual-tone signal 105 and/or, more generally, to implement the example receivers 120 described herein. The example process of FIG. 9 may be carried out by a processor, a controller and/or any other suitable processing device. For example, the example process of FIG. 9 may be embodied in coded instructions stored on a tangible medium such as a flash memory, a read-only memory (ROM) and/or random-access memory (RAM) associated with a processor (e.g., the example processor P105 discussed below in connection with FIG. 10). Alternatively, some or all of the example process of FIG. 9 may be implemented using any combination(s) of circuit(s), ASIC(s), PLD(s), FPLD(s), discrete logic, hardware, firmware, etc. Also, some or all of the example process of FIG. 9 may be implemented manually or as any combination of any of the foregoing techniques, for example, any combination of firmware, software, discrete logic and/or hardware. Further, although the example operations of FIG. 9 are described with reference to the flowchart of FIG. 9, many other methods of implementing the operations of FIG. 9 may be employed. For example, the order of execution of the blocks may be changed, and/or one or more of the blocks described may be changed, eliminated, sub-divided, or combined. Additionally, any or all of the example process of FIG. 9 may be carried out sequentially and/or carried out in parallel by, for example, separate processing threads, processors, devices, discrete logic, circuits, etc.

The example process of FIG. 9 begins with the example tone active detector 545 determining whether the first tone 210 of a dual-tone signal 105 has been detected (block 905). If the first tone 210 is detected (block 905), the up/down counter 520 measures the time $t_{REF}$ (measured in cycles of the system clock 515) for the tone counter 535 to count a fixed or preset number (e.g., 63) of cycles of the first tone 210 (block 910).

The state machine 505 waits until the value of the system clock counter 525 to reach a fixed or preset value (e.g., 416) (block 915). While the up/down counter 520 counts down from $t_{REF}$ to zero, the tone counter 535 counts cycles of the second tone 215 (block 920). The example decoder 550 compares the value of the tone counter 535 $count_2$ to one or more thresholds to identify an event 125 (block 925) and outputs the identified event 125 (block 930). Control then returns to block 905 to wait for the start of another dual-tone signal 105.

Figure 10:
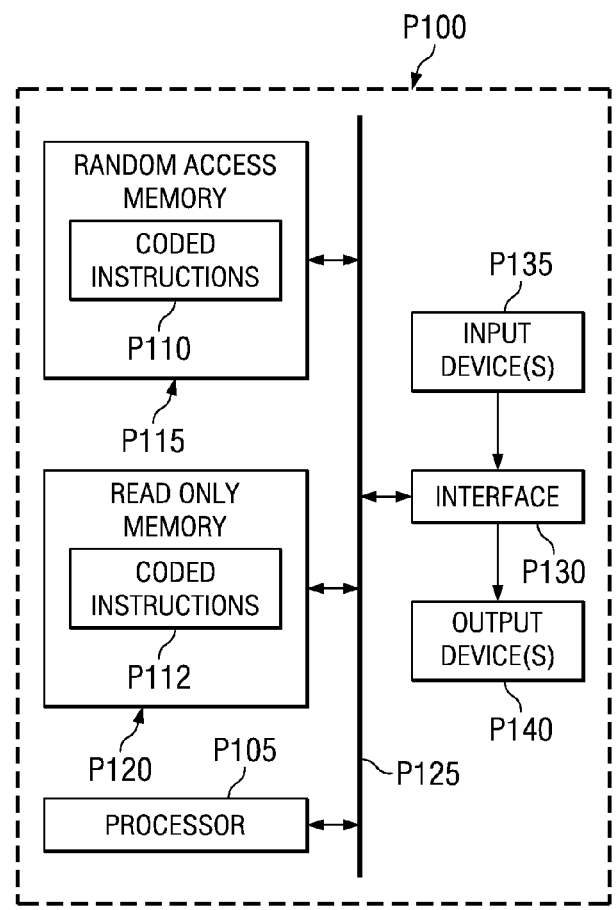
FIG. 10 is a schematic illustration of an example processor platform that may be used and/or programmed to execute the example process of FIG. 2 and/or, more generally, to implement the example dual-tone signal receivers described herein.

FIG. 10 is a schematic diagram of an example processor platform P100 that may be used and/or programmed to implement the example receivers 120 disclosed herein. For example, the processor platform P100 can be implemented by one or more general-purpose processors, processor cores, microcontrollers, etc.

The processor platform P100 of the example of FIG. 10 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example process of FIG. 9 to implement the example methods and apparatus described herein.

The processor P105 is in communication with the main memory (including a ROM P120 and/or the RAM P115) via a bus P125. The RAM P115 may be implemented by dynamic random-access memory (DRAM), synchronous dynamic random-access memory (SDRAM), and/or any other type of RAM device, and ROM may be implemented by flash memory and/or any other desired type of memory device. Access to the memory P115 and the memory P120 may be controlled by a memory controller (not shown). The memory P115, P120 may be used to, for example, implement the example tone value register 540 and/or to store the values of the example counters 520, 525 and/or 535.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The example input device(s) P135 may be used to, for example, implement the example tone converter 530 of FIG. 5. The example output device(s) P140 may be used to, for example, output an identified event 125.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:
a tone detector to detect a start of a first tone of a dual-tone signal;
a first counter to count first cycles of the first tone when the first tone is detected;
a second counter to count second cycles of a system clock while the first counter is counting the first cycles of the first tone and the first count of cycles is less than a first threshold;
a third counter to count third cycles of the system clock when the first tone is detected;
state control logic to start the second counter counting third cycles of the system clock when a time period elapses, the third count of cycles of the system clock being substantially equal to the second count of cycles, the first counter to count fourth cycles of a second tone of the dual-tone signal while the second counter is counting the third cycles of the system clock; and
a decoder to compare the fourth count of cycles to a second threshold to identify an event represented by the dual-tone signal.

2. The apparatus of claim 1, where the apparatus further comprises a fourth counter to count sixth cycles of the system clock when the first tone is detected, the state control logic to compare the sixth count of cycles to a third threshold to determine when the time period elapses.

3. The apparatus of claim 2, wherein the third threshold is selected to accommodate an operating range tolerance of the system clock.

4. The apparatus of claim 2, wherein a nominal operating frequency of the system clock is the frequency of the first tone, the first threshold is 63 and the third threshold is 416.

5. The apparatus of claim 1, wherein the apparatus further comprises a resistor-capacitor (RC) delay to determine when the time period elapses.

6. The apparatus of claim 1, wherein the first and second counters comprise gray-coded counters.

7. The apparatus of claim 1, wherein the second counter comprises a register to store the second count of cycles when the first count of cycles equals the first threshold, and the second counter is to count the third cycles of the system clock by initializing a current count using the register and counting down to zero.

8. The apparatus of claim 1, wherein the apparatus further comprises a tone converter to convert an analog first tone signal to the first tone signal, wherein the first counter counts rising edges of the first tone signal.

9. The apparatus of claim 1, wherein the tone detector is to detect the first tone signal by detecting a rising edge of the first tone signal.

10. The apparatus of claim 1, wherein the decoder is to compare the fourth count of cycles to the second threshold, a third threshold and a fourth threshold to determine the frequency of the second tone, the second, third and fourth thresholds defining two count ranges for respective ones of two events that may be represented by the dual-tone signal.

11. An apparatus comprising:
a transmitter that is configured to transmit a multi-tonal signal;
a transmission medium that is coupled to the transmitter; and
a receiver having:
a clocking circuit that is configured to generate a clock signal;
a tone detector that is coupled to the transmission medium;

a first counter that is coupled to the transmission medium, wherein the first counter is configured to count cycles of the multi-tonal signal;

a second counter that is coupled to the clocking circuit, wherein the second counter is configured to count cycles of the clock signal;

a third counter that is coupled to the clocking circuit, wherein the third counter is configured to count cycles of the clock signal;

a state machine that is coupled to the tone converter and the first, second, and third counters, wherein the state machine is configured to:

enable the first, second, and third counters to begin counting when a first tone is detected, wherein the first counter is configured to generate a first count value, and wherein the third counter is configured to generate a second count value;

reset the first counter when the first count value reaches a first threshold;

stop the second counter when the first count value reaches the threshold so as to generate a third count value;

enable the second counter to count down from the third count value when the second count value reaches a second threshold; and enable the first counter to begin counting when the second count value reaches the second threshold so as to generate a fourth count value; and a decoder that is coupled to the state machine, wherein the decoder is configured to identify an event represented by the multi-tone signal from the fourth count value.

12. The apparatus of claim 11, wherein the receiver further comprises a tone converter that is coupled between the transmission medium and the tone detector and between the transmission medium and the first counter.

13. The apparatus of claim 12, wherein the tone converter further comprises an analog-to-digital converter.

14. The apparatus of claim 13, wherein the apparatus further comprises a register that is coupled to the tone counter and the state machine, wherein the tone counter is configured to store the fourth count value.

15. The apparatus of claim 14, wherein the decoder further comprises:

a plurality of comparators, wherein each comparator is configured to receive the fourth count value; and an output circuit that is coupled to each of the comparators.

16. The apparatus of claim 15, wherein the output circuit further comprises a plurality of latches.

17. A method comprising:

enabling first, second, and third counters to begin counting when a first tone from a multi-tonal signal is detected, wherein the first counter is configured to generate a first count value, and wherein the third counter is configured to generate a second count value;

resetting the first counter when the first count value reaches a first threshold;

stopping the second counter when the first count value reaches the threshold so as to generate a third count value;

enabling the second counter to count down from the third count value when the second count value reaches a second threshold;

enabling the first counter to begin counting when the second count value reaches the second threshold so as to generate a fourth count value; and identifying an event represented by the multi-tone signal from the fourth count value.

18. The method of claim 17, wherein the method further comprises digitizing the multi-tonal signal.

19. The method of claim 18, wherein step of identifying further comprises comparing the fourth count value to a plurality of threshold values.

* * * * *